United States Patent [19]

Rocazella et al.

[11] Patent Number: 5,500,244
[45] Date of Patent: Mar. 19, 1996

[54] METHOD FOR FORMING METAL MATRIX COMPOSITE BODIES BY SPONTANEOUSLY INFILTRATING A RIGIDIZED FILLER MATERIAL AND ARTICLES PRODUCED THEREFROM

[76] Inventors: Michael A. Rocazella, 1205 Spring Valley Rd., Newark, Del. 19711; Kurt J. Becker, 136 Kenmark Rd., Newark, Del. 19713; Michael K. Aghajanian, 604 Helmsdale Ct., Bel Air, Md. 21014

[21] Appl. No.: 218,961

[22] Filed: Mar. 28, 1994

Related U.S. Application Data

[63] Continuation of Ser. No. 807,430, Dec. 13, 1991, Pat. No. 5,298,283, which is a continuation of Ser. No. 521,200, May 9, 1990, abandoned.

[51] Int. Cl.$^6$ ............................................. B05D 7/22
[52] U.S. Cl. ........................... 427/181; 427/202; 427/203; 427/204; 427/214; 427/215; 427/419.2; 427/431; 427/432
[58] Field of Search ............................ 427/18, 202, 203, 427/204, 214, 215, 419.2, 431, 432; 164/54, 57.1

[56] References Cited

U.S. PATENT DOCUMENTS

| | | | |
|---|---|---|---|
| 3,031,340 | 4/1962 | Girardot | 117/118 |
| 3,149,409 | 9/1964 | Maruhn | 29/156.5 |
| 3,364,976 | 1/1968 | Reding et al. | 164/63 |
| 3,396,777 | 8/1968 | Reding, Jr. | 164/97 |

(List continued on next page.)

FOREIGN PATENT DOCUMENTS

| | | | |
|---|---|---|---|
| 0071449 | 2/1983 | European Pat. Off. | B22C 13/08 |
| 0080551 | 6/1983 | European Pat. Off. | C22C 1/09 |
| 0094353 | 11/1983 | European Pat. Off. | C25C 3/08 |
| 0101948 | 3/1984 | European Pat. Off. | B22D 19/14 |
| 0115742 | 8/1984 | European Pat. Off. | C25C 3/08 |
| 0245192 | 11/1987 | European Pat. Off. | C04B 35/65 |
| 0291441 | 11/1988 | European Pat. Off. | C22C 1/09 |
| 0313271 | 4/1989 | European Pat. Off. | C22C 1/09 |
| 0323945 | 7/1989 | European Pat. Off. | C04B 41/88 |
| 0333629 | 9/1989 | European Pat. Off. | C04B 41/88 |
| 0340957 | 11/1989 | European Pat. Off. | C22C 1/09 |
| 0364963 | 4/1990 | European Pat. Off. | C22C 1/09 |
| 2819076 | 10/1979 | Germany | B32B 15/20 |
| 0144441 | 8/1983 | Japan | C22C 1/09 |
| 2156718 | 10/1985 | United Kingdom | B22D 19/00 |

OTHER PUBLICATIONS

F. Delannay, L. Froyen, and A. Deruyttere, "Review: The Wetting of Solids by Molten Metals and Its Relation to the Preparation of Metal–Matrix Composites", Journal of Materials Science, vol. 22, No. 1, pp. 1–16, Jan. 1987.

G. R. Edwards and D. L. Olson, "The Infiltration Kinetics of Aluminum in Silicon Carbide Compacts", Annual Report from Center for Welding Research, Colorado School of Mines, under ONR Contact No. M00014-85-K-0451, DTIC Report AD-A164 662, Jul. 1987.

(List continued on next page.)

*Primary Examiner*—Shrive Beck
*Assistant Examiner*—Benjamin L. Utech

[57] ABSTRACT

The present invention relates to a novel process for forming metal matrix composite bodies. Particularly, an infiltration enhancer and/or an infiltration enhancer precursor and/or an infiltrating atmosphere are in communication with a rigidized filler material or a rigidized preform, at least at some point during the process, which permits molten matrix metal to spontaneously infiltrate the rigidized filler material or rigidized preform. Such spontaneous infiltration occurs without the requirement for the application of any pressure or vacuum. In one embodiment of the invention, a filler material or preform can be rigidized by firing and at least partially sintering the filler material so as to provide a three-dimensionally interconnected network of sintered filler material. In another embodiment of the invention, a refractory material mixture is contacted against an exterior surface of a preform or filler material and at least at some point during the process becomes structurally supportive.

11 Claims, 1 Drawing Sheet

U.S. PATENT DOCUMENTS

| | | | |
|---|---|---|---|
| 3,547,180 | 12/1970 | Cochran et al. | 164/61 |
| 3,608,170 | 9/1971 | Larson et al. | 29/149.5 |
| 3,718,441 | 2/1973 | Landingham | 29/182.1 |
| 3,864,154 | 2/1975 | Gazza et al. | 29/123 B |
| 3,868,267 | 2/1975 | Gazza et al. | 117/22 |
| 3,915,699 | 10/1975 | Umehara et al. | 75/208 R |
| 3,969,553 | 7/1976 | Kondo et al. | 427/299 |
| 3,970,136 | 7/1976 | Cannell et al. | 164/108 |
| 4,076,888 | 2/1978 | Perugini et al. | 427/227 |
| 4,082,864 | 4/1978 | Kendall et al. | 427/248 |
| 4,148,894 | 4/1979 | Hillig et al. | 428/408 |
| 4,232,091 | 11/1980 | Grimshaw et al. | 428/472 |
| 4,376,803 | 3/1983 | Katzman | 428/408 |
| 4,376,804 | 3/1983 | Katzman | 428/408 |
| 4,450,207 | 5/1984 | Donomoto et al. | 428/614 |
| 4,473,103 | 9/1984 | Kenney et al. | 164/97 |
| 4,548,253 | 10/1985 | Eupatanier et al. | 164/97 |
| 4,559,246 | 12/1985 | Jones | 427/299 |
| 4,570,316 | 2/1986 | Sakamaki et al. | 29/156.8 R |
| 4,630,665 | 12/1986 | Novak et al. | 164/97 |
| 4,657,065 | 4/1987 | Wada et al. | 164/461 |
| 4,659,593 | 4/1987 | Rocher et al. | 427/190 |
| 4,662,429 | 5/1987 | Wada et al. | 164/461 |
| 4,673,435 | 6/1987 | Yamaguchi et al. | 75/235 |
| 4,713,111 | 12/1987 | Cameron et al. | 75/68 R |
| 4,753,690 | 6/1988 | Wada et al. | 148/11.5 A |
| 4,777,097 | 10/1988 | Kubo et al. | 428/614 |
| 4,802,524 | 2/1989 | Donomoto | 164/97 |
| 4,828,008 | 5/1989 | White et al. | 164/66.1 |
| 4,871,008 | 10/1989 | Dwivedi et al. | 164/6 |
| 4,932,099 | 6/1990 | Corwin | 164/97 |
| 4,955,135 | 9/1970 | Pinkhasov | 427/417.6 |

OTHER PUBLICATIONS

A. Mortensen, M. N. Gungor, J. A. Cornie, and M. C. Flemings "Alloy Microstructures in Cast Metal Matrix Composites", Journal of Metals, vol. 38, No. 3, pp. 30–35, Mar. 1986.

Journal of Materials Science Letters 4 (1985) 1527–1529 J. P. Rocher.

A. Mortensen, J. A. Cornie, and M. C. Flemings, "Solidification Processing of Metal–Matrix Composites", Journal of Metals, vol. 40, No. 2, pp. 12–19, Feb. 1988.

B. D. Sparks and F. W. Meadus, "The Development of an Infiltrated Lead/Iron Composite Materials for Use as a Non–toxic Bird Shot", Composites, pp. 37–39, Jan. 1978.

METHOD FOR FORMING METAL MATRIX COMPOSITE BODIES BY SPONTANEOUSLY INFILTRATING A RIGIDIZED FILLER MATERIAL AND ARTICLES PRODUCED THEREFROM

This is a continuation of application Ser. No. 07/807,430 filed on Dec. 13, 1991 which issued on Mar. 29, 1994, as U.S. Pat. No. 5,298,283, which was a continuation of U.S. patent application Ser. No. 07/521,200, filed May 9, 1990, now abandoned.

FIELD OF INVENTION

The present invention relates to a novel process for forming metal matrix composite bodies. Particularly, an infiltration enhancer and/or an infiltration enhancer precursor and/or an infiltrating atmosphere are in communication with a rigidized filler material or a rigidized preform, at least at some point during the process, which permits molten matrix metal to spontaneously infiltrate the rigidized filler material or rigidized preform. Such spontaneous infiltration occurs without the requirement for the application of any pressure or vacuum.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, coefficient of thermal expansion (C.T.E.), density, thermal conductivity and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher specific stiffness (e.g., elastic modulus over density), wear resistance, thermal conductivity, low coefficient of thermal expansion (C.T.E.)and high temperature strength and/or specific strength (e.g., strength over density) relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968 to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which can be formed into a preform, with molten matrix metal (e.g., aluminum) in the presence of an infiltrating atmosphere (e.g., nitrogen) under normal atmospheric pressures so long as an infiltration enhancer precursor and/or infiltration enhancer is present at least at some point during the process.

DESCRIPTION OF COMMONLY OWNED U.S. PATENT APPLICATIONS AND ISSUED PATENTS

The subject matter of this application is related to that of several other copending and co-owned patent applications and issued Patents. Particularly, these other copending patent applications and issued Patents describe novel methods for making metal matrix composite materials (hereinafter sometimes referred to as "Commonly Owned Metal Matrix Patent Applications" and patents).

A novel method of making a metal matrix composite material is disclosed in Commonly Owned U.S. patent application Ser. No. 049,171, filed May 13, 1987, in the names of White et al., and entitled "Metal Matrix Composites", now U.S. Pat. No. 4,828,008, which issued on May 9, 1989, and which published in the EPO on Nov. 17, 1988, as Publication No. 0291441. According to the method of this White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned and U.S. patent application Ser. No. 08/179,463, filed Jan. 10, 1994, which is a continuation of U.S. patent application Ser. No. 07/934,823, filed Aug. 24, 1992, now U.S. Pat. No. 5,277,989, which issued on Jan. 11, 1994, which is a continuation of U.S. patent application Ser. No. 07/657,286, filed Feb. 19, 1991, now U.S. Pat. No. 5,141,819, which issued on Aug. 25, 1992, which is a continuation of U.S. patent application Ser. No. 07/415,088, filed Sep. 29, 1989 (and now abandoned), which is a continuation of U.S. patent application Ser. No. 141,642, filed Jan. 7, 1988 (and now abandoned), in the names of Michael K. Aghajanian et al., and entitled "Method of Making Metal Matrix Composite with the Use of a Barrier", now U.S. Pat. No. 4,935,055, which issued on Jun. 19, 1990, and which published in the EPO on Jul. 12, 1989, as Publication No. 0323945. According to the method of this Aghajanian et al. invention, a barrier means (e.g., particulate titanium diboride or a graphite material such as a flexible graphite foil product sold by Union Carbide under the trade name Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and Copending U.S. patent application Ser. No. 07/994,064, filed Dec. 18, 1992, now U.S. Pat. No. 5,298,339, which issued on Mar. 29, 1994, which is a continuation of U.S. patent application Ser. No. 07/759,745, filed Sep. 12, 1991 (and now abandoned), which is a continuation of U.S. patent application Ser. No. 07/517,541, filed Apr. 24, 1990 (now abandoned), which is a continuation of U.S. patent application Ser. No. 168,284, filed Mar. 15, 1988 (and now abandoned), in the names of Michael K. Aghajanian and Marc S. Newkirk and entitled "Metal Matrix Composites and Techniques for Making the Same" and which published in the EPO on Sep. 20, 1989 as Publication No. 0333629. In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. Patent Application Serial No. 08/132,069, filed Oct. 4, 1993, which is a continuation of U.S. patent application Ser. No. 07/863,894, filed Apr. 6, 1992, now U.S. Pat. No. 5,249,621, which issued on Oct. 5, 1993, which is a continuation of U.S. patent application Ser. No. 07/521,043, filed May 9, 1990 (and now abandoned), which is a continuation in part of U.S. patent application Ser. No. 07/484,753, filed Feb. 23, 1990 (and now abandoned), which is a continuation in part of U.S. patent application Ser. No. 07/432,661, filed Nov. 7, 1989 (and now abandoned), which is a continuation in part of U.S. patent application Ser. No. 07/416,327, filed Oct. 6, 1989 (and now abandoned), which is a continuation in part application of U.S. patent application Ser. No. 07/349,590, filed May 9, 1989 (and now abandoned), which in turn is a continuation in part application of U.S. patent application Ser. No. 07/269,311, filed Nov. 10, 1988 (and now abandoned), all of which were filed in the names of Michael K. Aghajanian et al. and all of which are entitled "A Method of Forming Metal Matrix Composite Bodies By A Spontaneous Infiltration Process, and Products Produced Therefrom." According to these Aghajanian et al. applications, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian et al. applications that the spontaneous infiltration behavior should occur in other matrix metal/infiltration enhancer precursor/infiltrating atmosphere systems.

Each of the above-discussed Commonly Owned Metal Matrix Patent Applications and patents describes methods for the production of metal matrix composite bodies and novel metal matrix composite bodies which are produced therefrom. The entire disclosures of all of the foregoing Commonly Owned Metal Matrix Patent Applications and patents are expressly incorporated herein by reference.

SUMMARY OF THE INVENTION

A metal matrix composite body is produced by spontaneously infiltrating a rigidized permeable mass of filler material or a rigidized preform with a molten matrix metal. Specifically, an infiltration enhancer and/or an infiltration enhancer precursor and/or an infiltrating atmosphere are in communication with the rigidized filler material or preform, at least at some point during the process, which permits molten matrix metal to spontaneously infiltrate the rigidized filler material or preform.

It has been discovered that, in some cases, spontaneous infiltration of a molten matrix metal into a filler material or preform may result in minor microstructural modifications of the filler material or preform. Specifically, the formation of infiltration enhancer from an infiltration enhancer precursor may result in an overall volumetric expansion which could cause a minor displacement of filler material when the filler material is tightly packed. For example, if infiltration enhancer was formed as a coating on a filler material or preform and the filler material or preform was relatively dense, the formation of a coating could result in a minor displacement of filler material resulting in the formation of minor cracks in the filler material or preform and/or a lower volume percent of filler in the resultant metal matrix composite body. The formed minor cracks could lead to metal rich channels in the metal matrix composite body which, for some applications, may not be desirable. The actual infiltration of a matrix metal into a preform or filler material may result in a similar minor movement of a filler material or preform with the same attendant disadvantages. The present invention provides a means for assuring that displacement of a loose filler or a preform of filler material is minimized as well as maximizing the volume percent of filler material, thus enhancing the resultant properties of a formed metal matrix composite body.

In a first preferred embodiment, a rigidized filler material or preform is achieved by mixing a filler material with a colloidal oxide binder (e.g., colloidal alumina, colloidal silica, etc.). The colloidal oxide binder causes the formation of a three-dimensionally interconnected matrix within the filler material which functions as a rigidizing skeleton for the filler material. The skeleton that is formed may comprise a mixture of both colloidal oxide and filler material. The amount of colloidal oxide required to obtain desirable rigidizing properties can vary from about 1 weight percent to about 15 weight percent. The colloidal oxide may also affect the resultant properties of a formed metal matrix composite body. Specifically, typically, the colloidal oxide will be embedded by the matrix metal, thereby serving as a filler material.

In a second preferred embodiment of the invention, a filler material or preform can be rigidized by prefiring and at least partially sintering the filler material so as to provide a three-dimensionally interconnected network of sintered filler material. A sintering aid may or may not be required. The extent of prefiring (e.g., time and temperature) depends upon the amount of porosity desired in the filler material or preform prior to infiltration occurring. By increasing the density of the filler material or preform, the resultant volume percent of filler material present in the formed metal matrix composite increases. However, sintering should not result in the complete closure of all interconnected porosity because spontaneous infiltration of molten matrix metal into the sintered filler would be adversely affected (e.g., if the interconnected porosity was eliminated, the matrix metal would have no means to infiltrate and embed the filler material).

In a third preferred embodiment, a supportive structural refractory material surrounds at least a substantial portion of a filler material or preform and provides external structural support. Specifically, a filler material or preform may be placed within a rigid structure so as to prevent the filler material or preform from deforming during any portion of the spontaneous infiltration process. Alternatively, a refractory material mixture could be coated upon an exterior surface of a preform or filler material and become structurally supportive. The physical container and/or the refractory coating surrounding a preform or filler material can be of any desirable composition and/or thickness with the primary selection criteria being that the material does not adversely affect spontaneous infiltration and that the material functions as a rigidizing means.

In a fourth preferred embodiment of the invention, each of the three aforementioned embodiments may be combined, in any manner, so as to enhance synergistically the rigidizing effects of each. For example, a colloidal oxide may be mixed with a filler material in combination with the placement of an exterior rigidizing means. Such combination may enhance further the rigidizing effects on a filler material or preform.

In a final preferred embodiment of the invention, when an infiltration enhancer precursor is caused to volatilize and react with, for example, an infiltrating atmosphere to form infiltration enhancer in at least a portion of a filler material or preform, the amount of infiltration enhancer that is formed can be minimized so as to reduce any deleterious effects that such formation may have. Particularly, for example, in the aluminum/magnesium/nitrogen system, when magnesium volatilizes and reacts with nitrogen, a magnesium nitride infiltration enhancer is formed in at least a portion of the preform or filler material. The formation of magnesium nitride, in excessive amounts, could result in a volumetric expansion of the preform or filler material. Such volumetric expansion could lead to microcracks within a preform or filler. Accordingly, by controlling time and/or temperature and/or the amount of infiltration enhancer precursor and/or amount of infiltrating atmosphere, etc., the amount of infiltration enhancer which is formed in a preform or filler material can be controlled so that just a sufficient amount is manufactured to achieve desirable spontaneous infiltration.

In each of the above-discussed preferred embodiments, a precursor to an infiltration enhancer may be supplied to at least one of a filler material or preform and/or a matrix metal and/or an infiltrating atmosphere. The supplied infiltration enhancer precursor may thereafter react with at least one of the filler material or preform and/or the matrix metal and/or the infiltrating atmosphere to produce infiltration enhancer in at least a portion of, or on, the filler material or preform. Ultimately, at least during the spontaneous infiltration, a desirable amount of infiltration enhancer should be in contact with at least a portion of the filler material or preform.

In another preferred embodiment of the invention, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be in contact with at least a portion of the filler material or preform.

This application discusses various examples of matrix metals, which at some point during the formation of a metal matrix composite are contacted with an infiltration enhancer precursor, in the presence of an infiltrating atmosphere. Thus, various references will be made to particular matrix metal/infiltration enhancer precursor/infiltrating atmosphere systems which exhibit spontaneous infiltration. However, it is conceivable that many other matrix metal/infiltration enhancer precursor/infiltrating atmosphere systems other than those discussed in this application may behave in a manner similar to the systems discuss above herein. Specifically, spontaneous infiltration behavior has been observed in the aluminum/magnesium/nitrogen system; the aluminum/strontium/nitrogen system; the aluminum/zinc/oxygen system; and the aluminum/calcium/nitrogen system. Accordingly, even though this application discusses only those systems referred to above herein (with particular emphasis being placed upon the aluminum/magnesium/nitrogen system), it should be understood that other matrix metal/infiltration enhancer precursor/infiltrating atmosphere systems may behave in a similar manner.

In a preferred embodiment for achieving spontaneous infiltration into a permeable mass of filler material or a preform, molten matrix metal is contacted with the preform or filler material. The preform or filler material may have admixed therewith, and/or at some point during the process, be exposed to, an infiltration enhancer precursor. Moreover, in a preferred embodiment, the molten matrix metal and/or preform or filler material communicate with an infiltrating atmosphere for at least a portion of the process. In another preferred embodiment, the matrix metal and/or preform or filler material communicate with an infiltrating atmosphere for substantially all of the process. The preform or filler material will be spontaneously infiltrated by molten matrix metal, and the extent or rate of spontaneous infiltration and formation of metal matrix composite will vary with a given set of processing conditions including, for example, the concentration of infiltration enhancer precursor provided to the system (e.g., in the molten matrix alloy and/or in the filler material or preform and/or in the infiltrating atmosphere), the size and/or composition of the filler material, the size and/or composition of particles in the preform, the available porosity for infiltration into the preform or filler material, the time permitted for infiltration to occur, and/or the temperature at which infiltration occurs. Spontaneous infiltration typically occurs to an extent sufficient to embed substantially completely the preform or filler material.

Moreover, by varying the composition of the matrix metal and/or the processing conditions, the physical and mechanical properties of the formed metal matrix composite bodies may be engineered to any particular application or need. Further, by subjecting a formed metal matrix composite body to a post treatment process (e.g., directional solidification, heat treatment, etc.) the mechanical and/or physical properties may be further engineered to meet any particular application or need. Still further, by controlling the processing conditions during the formation of a metal matrix composite the nitrogen content of the formed metal matrix composite may be tailored to meet a wide range of industrial applications.

Moreover, by controlling the composition and/or size (e.g., particle diameter) and/or geometry of the filler material or the material comprising the preform, the physical and/or mechanical properties of the formed metal matrix composite can be controlled or engineered to meet any number of industrial needs. For example, it has been discovered that wear resistance of the metal matrix composite can be increased by increasing the size of the filler material (e.g., increasing the average diameter of the filler material particles), given that the wear resistance of filler material is higher than that of the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler material, may be achieved, thereby resulting in a metal matrix composite body with an increased density. Moreover, by following the teachings of the present invention, even higher filler loadings can be achieved by minimizing the ability of the preform or filler material to be displaced or moved during any portion of the spontaneous infiltration process. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense and rigid filler material or preform with at least some interconnected porosity (e.g., about 95 volume percent). Accordingly, by practicing any of the above teachings, alone or in combination, a metal matrix composite can be engineered to contain a desired combination of properties.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes with, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" include materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal, etc.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multi-phase. Fillers may be provided in a wide variety of forms and sizes, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Hot-Topping", as used herein, refers to the placement of a substance on one end (the "topping" end) of an at least partially formed metal matrix composite which reacts exothermally with at least one of the matrix metal and/or filler material and/or with another material supplied to the topping end. This exothermic reaction should provide sufficient heat to maintain the matrix metal at the topping end in a molten state while the balance of the matrix metal in the composite cools to solidification temperature.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal.

"Infiltration Enhancer", as used herein, means a material which promotes or assists in the spontaneous infiltration of a matrix metal into a filler material or preform. An infiltration enhancer may be formed from, for example (1), a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed from a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with (1) the matrix metal (2) the, preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite body (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or a filler material or preform in a manner which would be significantly detrimental to the spontaneous infiltration mechanism. The non-reactive vessel may be disposable and removable after the spontaneous infiltration of the molten matrix metal has been completed.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Rigidized", as used herein, means that a preform or filler material has been made stronger so as to be more resistive to relative displacement by any exerted stresses.

"Spontaneous Infiltration", as used herein, means the infiltration of matrix metal into the permeable mass of filler or preform occurs without requirement for the application of pressure or vacuum (whether externally applied or internally created).

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

Figure 1:
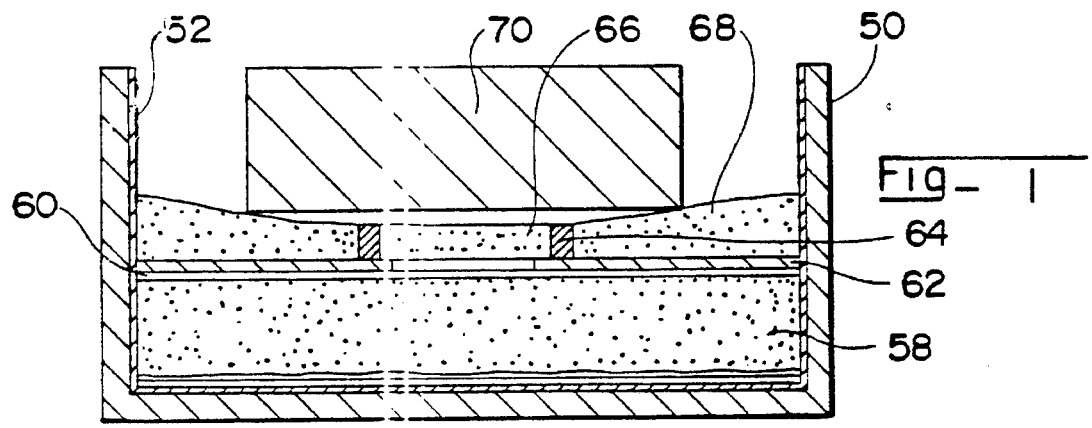
FIG. 1 is a schematic cross-sectional view of a lay-up used in accordance with the present invention.

The present invention relates to forming a metal matrix composite by spontaneously infiltrating a rigidized filler material or preform with molten matrix metal. Particularly, an infiltration enhancer and/or an infiltration enhancer precursor and/or an infiltrating atmosphere are in communication with the rigidized filler material or preform, at least at some point during the process, which permits molten matrix metal to spontaneously infiltrate the filler material or preform.

In a first preferred embodiment, a rigidized filler material or preform is achieved by mixing a filler material with a colloidal oxide binder (e.g., colloidal alumina, colloidal silica, etc.). The colloidal oxide binder causes the formation of a three-dimensionally interconnected matrix within the filler material which functions as a rigidizing skeleton for the filler material. The skeleton that is formed may comprise a mixture of both colloidal oxide and filler material. The amount of colloidal oxide required to obtain desirable rigidizing effects can vary from about 1 weight percent to about 15 weight percent. The Colloidal oxide may also affect the resultant properties of a formed metal matrix composite body. Specifically, typically, the colloidal oxide will be embedded by the matrix metal, thereby serving as a filler material.

In a second preferred embodiment of the invention, a filler material or preform can be rigidized by prefiring and at least partially sintering the filler material so as to provide a three-dimensionally interconnected network of sintered filler material. A sintering aid may or may not be required. The extent of prefiring (e.g., time and temperature) depends upon the amount of porosity desired in the filler material or preform prior to infiltration occurring. By increasing the density of the filler material or preform, the resultant volume percent of filler material present in the formed metal matrix composite increases. However, sintering should not result in the complete closure of all interconnected porosity because spontaneous infiltration of molten matrix metal into the sintered filler would be adversely affected (e.g., if the interconnected porosity was eliminated, the matrix metal would have no means to infiltrate and embed the filler material).

In a third preferred embodiment, a supportive structural refractory material surrounds at least a substantial portion of a filler material or preform and provides external structural support. Specifically, a filler material or preform may be placed within a rigid structure so as to prevent the filler material or preform from deforming during any portion of the spontaneous infiltration process. Alternatively, a refractory material mixture could be coated upon an exterior surface of a preform or filler material and become structurally supportive. The physical container and/or the refractory coating surrounding a preform or filler material can be of any desirable composition and/or thickness with the primary selection criteria being that the material does not adversely affect spontaneous infiltration and that the material functions as a rigidizing means.

In a fourth preferred embodiment of the invention, each of the three aforementioned embodiments may be combined, in any manner, so as to enhance synergistically the rigidizing effects of each. For example, a colloidal oxide may be mixed with a filler material in combination with the placement of an exterior rigidizing means. Such combination may enhance further the rigidizing effects on a filler or preform.

In a final preferred embodiment of the invention, when an infiltration enhancer precursor is caused to volatilize and react with, for example, an infiltrating atmosphere to form infiltration enhancer in at least a portion of a filler material or preform, the amount of infiltration enhancer that is formed can be minimized so as to reduce any deleterious effects that such formation may have. Particularly, for example, in the aluminum/magnesium/nitrogen system, when magnesium volatilizes and reacts with nitrogen, a magnesium nitride infiltration enhancer is formed in at least a portion of preform or filler material. The formation of magnesium nitride, in excessive amounts, could result in a volumetric expansion of the preform or filler material. Such volumetric expansion could lead to microcracks within a preform or filler. Accordingly, by controlling time and/or temperature and/or the amount of infiltration enhancer precursor and/or amount of infiltrating atmosphere, etc., the amount infiltration enhancer which is formed in a preform or filler material can be controlled so that just a sufficient amount is manufactured to achieve desirable spontaneous infiltration.

In regard to each of the above-discussed preferred embodiments and without wishing to be bound by any particular theory or explanation, when an infiltration enhancer precursor is utilized in combination with at least one of the matrix metal, and/or filler material or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

Thus, for example, if an infiltration enhancer precursor was included or combined with, at least at some point during the process, molten matrix metal, it is possible that the infiltration enhancer could volatilize from the molten matrix metal and react with at least one of the filler material or preform and/or the infiltrating atmosphere. Such reaction could result in the formation of a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, molten matrix metal may have a tendency to react (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form additional infiltration enhancer, and so on, could occur, until the result achieved is a spontaneously infiltrated metal matrix composite.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium was the infiltration enhancer precursor and nitrogen was the infiltrating atmosphere, the infiltration enhancer could be magnesium nitride which would be located in at least a portion of the preform or filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not adversely react with the aluminum matrix metal and/or the filler material when the aluminum is made molten. A filler material or preform can thereafter be contacted with molten aluminum matrix metal and spontaneously infiltrated.

Moreover, rather than supplying an infiltration enhancer precursor, an infiltration enhancer may be supplied directly to at least one of the preform or filler material, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform (or filler material) and matrix metal or the preform (or filler material) alone may result in a reduction in required amount of magnesium to achieve spontaneous infiltration (discussed in greater detail later herein).

The volume percent of nitrogen in the infiltrating atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alley may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 Crystolon (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). For example, in the aluminum/magnesium/nitrogen system, if the magnesium was applied to a surface of the matrix metal it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C., and preferably a process temperature of at least about 750° C.– 800° C. Temperatures generally in excess of 1200° C. do not appear to benefit the process, and a particularly useful temperature range has been found to be from about 675° C. to about 1000° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to any nitride formation, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g. alumina, magnesia, zirconia; (b) carbides, e.g. silicon carbide; (c) borides, e.g. aluminum dodecaboride, titanium diboride, and (d) nitrides, e.g. aluminum nitride, and (e) mixtures thereof. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Raking Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375, entitled "Method of Making Composite Ceramic Articles Having Embedded Filler", in the names of Marc S. Newkirk et al., also exhibit desirable infiltration properties relative to commercially available alumina products. The subject matter of each of the issued Patent and Copending Patent Application is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patents.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the filler material does not limit infiltration, although a higher temperature or longer time period may be needed for complete infiltration of a mass of smaller particles than for larger particles or vice-versa depending on the particular reaction conditions. Average particle diameters as small as a micron or less to about 1100 microns or more can be successfully utilized in the present invention, with a range of about 2 microns through about 1000 microns being preferred for a vast majority of commercial applications. Further, the mass of filler material (or preform) to be infiltrated should be permeable (i.e., contain at least some interconnected porosity to render it permeable to molten matrix metal and/or to the infiltrating atmosphere). Moreover, by controlling the size (e.g., particle diameter) and/or geometry and/or composition of the filler material or the material comprising the preform, the physical and mechanical properties of the formed metal matrix composite can be controlled or engineered to meet any number of industrial needs. For example, wear resistance of the metal matrix composite can be increased by increasing the size of the filler material (e.g., increasing the average diameter of the filler material particles) given that the filler material has a higher wear resistance than the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, coefficient of thermal expansion, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler materials, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with closed cell porosity or into a fully dense structure that would prevent infiltration by the molten alloy. Specifically, volume fractions on the order of about 60 to 80 volume percent can be achieved by methods such as vibrational packing, controlling particle size distribution, etc. However, alternative techniques can be utilized to achieve even higher volume fractions of filler. Volume fractions of filler on the order of 40 to 50 percent are preferred for thermo-forming in accordance with the present invention. At such volume fractions, the infiltrated composite maintains or substantially maintains its shape, thereby facilitating secondary processing. Higher or lower particle loadings or volume fractions could be used, however, depending on the desired final composite loading after thermo-forming. Moreover, methods for reducing particle loadings can be employed in connection with the thermo-forming processes of the present invention to achieve lower particle loadings.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite and improve the bonding of the filler to the matrix metal. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Further, the constituency of the matrix metal within the metal matrix composite and defects, for example, porosity, may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container. Further, the constituency of the metal matrix may be modified after formation of the metal matrix composite. For example, exposure of the formed metal matrix composite to a heat treatment may improve the tensile strength of the metal matrix composite. (The standard test for tensile strength is ASTM-D3552-77 (reapproved 1982).)

For example, a desirable heat treatment for a metal matrix composite containing a 520.0 aluminum alloy as the matrix metal may comprise heating the metal matrix composite to an elevated temperature, for example, to about 430° C., which is maintained for an extended period (e.g., 18–20 hours). The metal matrix may then be quenched in boiling water at about 100° C. for about 20 seconds (i.e., a T-4 heat treatment) which can temper or improve the ability of the composite to withstand tensile stresses.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition from the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement beyond the defined surface boundary of the ceramic filler. Barrier means may be used during spontaneous infiltration or in any molds or other fixtures utilized in connection with thermoforming of the spontaneously infiltrated metal matrix composite, as discussed in greater detail below.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite foil product that is sold under the trademark Grafoil®, registered to Union Carbide. This graphite foil exhibits sealing characteristics that prevent the migration of molten aluminum alloy beyond the defined surface boundary of the filler material. This graphite foil is also resistant to heat and is chemically inert. Grafoil® graphite foil is flexible, compatible, conformable and resilient. It can be made into a variety of shapes to fit any barrier application. However, graphite barrier means may be employed as a slurry or paste or even as a paint film around and on the boundary of the filler material or preform. Grafoil® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. Moreover, the particle size of the barrier material may affect the ability of the material to inhibit spontaneous infiltration. The transition metal borides are typically in a particulate form (1–30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary With a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Various demonstrations of the present invention are included in the Examples immediately following. However, these Examples should be considered as being illustrative and should not be construed as limiting the scope of the invention as defined in the appended claims.

EXAMPLE 1

This Example demonstrates that through the use of a colloidal alumina refractory high temperature binder in a preform that any preform expansion during spontaneous infiltration can be reduced or even substantially completely eliminated.

An aqueous solution of BLUONIC® A colloidal alumina (Buntrock Industries, Inc., Lively, Va.) totaling about 261 grams was diluted with about 523 grams of water and placed into a 2 liter NALGENE® plastic jar (Nalge Company, Rochester, N.Y.). About 1281 grams of 220 grit 39 CRYSTOLON® green silicon carbide particulate (Norton Company, Worcester, Mass.) and about 549 grams of 500 grit 39 CRYSTOLON® green silicon carbide particulate were added to the jar to prepare a slurry for sediment casting. The total slurry weight was about 2615 grams and comprised by weight about 49 percent 220 grit silicon carbide, about 21 percent 500 grit silicon carbide, about 1.2 percent colloidal alumina (dry basis) and about 28 percent water. After roll mixing the slurry in the plastic jar for about 45 minutes the slurry was poured into a Grade GI-1000 silicone rubber mold (Plastic Tooling Supply Co., Exton, Pa.) having an internal cavity measuring about 3 inches square and about 1½ inches deep. The mold was vibrated to assist in sedimentation. After for about ½ hour, the excess water on the surface of the formed sediment cast preform was removed with a paper towel. After vibrating for an additional 1 to 1½ hours, the remaining surface water was removed and the silicone rubber mold was removed from the vibration table and placed into a freezer. Residual water in the preform was permitted to freeze thoroughly and the silicone rubber mold and its preform were removed from the freezer and the frozen sediment cast preform was withdrawn from the mold. The preform was then placed on a bed of 90 grit 38 ALUNDUM® alumina particulate material (Norton Company) and allowed to dry in air at room temperature for about 16 hours.

After drying, the sediment cast preform was transferred to a different bedding of 90 grit 38 ALUNDUM® alumina supported by a refractory plate measuring about 12 inches long by about 6 inches wide by about 1 inch thick and placed into a resistance heated air atmosphere furnace. The furnace temperature was increased from about room temperature to a temperature of about 1050° C. in a period of about 10 hours. After maintaining a temperature of about 1050° C. for about 2 hours, the temperature was decreased to about room temperature in a period of about 10 hours.

As shown in FIG. 1, a graphite foil box 52 measuring about 4 inches square and about 3 inches tall was fabricated from a single sheet of GRAFOIL® graphite foil (Union Carbide Company, Danbury, Conn.) measuring about 0.015 inches thick by making strategically located cuts and folds in the sheet. The folds in the GRAFOIL® sheet were cemented together with RIGIDLOCK® graphite cement (Polycarbon Corporation, Valencia, Calif.). Strategically placed staples helped to reinforce the graphite cement. The GRAFOIL® box 52 was then placed within a graphite boat 50, said graphite boat 50 having substantially the same dimensions as the box 52. The fired preform 58 was then placed into the bottom of the GRAFOIL® box 52. About 0.36 gram of magnesium particulate 60 (−100 mesh, Hart Corporation, Tamaqua, Pa.) was sprinkled evenly over the top surface of the fired preform 58. A gating means 62, 64 comprising a sheet of GRAFOIL® 62 measuring about 4 inches square with an approximately 1½ inch diameter hole cut in the center, was cemented with RIGIDLOCK® graphite cement to a graphite riser ring 64 measuring about ⅜ inch tall and about 1½ inches in inside diameter such that the inside diameter of the ring substantially coincided with the hole in the GRAFOIL® sheet 62. The gating means 62, 64 was then placed into the GRAFOIL® box 52 on top of the layer of magnesium particulate 60 and oriented such that the GRAFOIL® sheet 62 contacted the magnesium particulate layer 60 and the graphite riser ring 64 was on a top surface of the GRAFOIL® sheet 62. The cavity inside the graphite riser ring 64 was filled with an admixture 66 comprising by weight about 50 percent magnesium particulate (−100 mesh, Hart Corporation), about 1 percent magnesium particulate (−325 mesh, Hart Corporation), about 25 percent 54 grit 39 CRYSTOLON® green silicon carbide particulate (Norton Company) and about 24 percent 90 grit 39 CRYSTOLON® green silicon carbide particulate. A bedding material admixture 68 comprising by weight about 15 percent Grade P-941 glass frit (Industrial Chemicals Division of Mobay Chemical Corporation, Baltimore, Md.) and the balance equal weight fractions of 90 grit, 220 grit, and 500 grit E1 ALUNDUM® alumina (Norton Company) was poured into the GRAFOIL® box 52 on the GRAFOIL® sheet 62 around the graphite riser ring 64 to a level substantially flush with the top of the ring 64 but slightly higher out towards the walls of the GRAFOIL® box 52. A matrix metal ingot 70 weighing about 300 grams and measuring about 2 inches square and about 1¾ inches tall and comprising by weight about 15 percent silicon, about 5 percent magnesium and the balance aluminum, was placed into the GRAFOIL® box 52 and centered over the graphite riser ring 64 to form a lay-up.

The graphite boat 50 and its contents were placed into a resistance heated controlled atmosphere furnace at substantially room temperature. The furnace was sealed, evacuated to about 30 inches of mercury vacuum, and backfilled with nitrogen gas to about atmospheric pressure. A nitrogen gas flow rate of about 4 liters per minute was established. The temperature in the furnace was then increased to about 825° C. at a rate of about 150° C. per hour. After maintaining a temperature of about 825° C. for about 10 hours, the temperature was then decreased to about 700° C. at a rate of about 200° C. per hour. At a temperature of about 700° C., the furnace was opened and the graphite boat 50 and its contents were removed and placed onto a water cooled aluminum quench plate. FEEDOL® No. 9 hot topping particulate mixture was poured onto the residual molten matrix metal reservoir to directionally solidify the matrix metal in the metal matrix composite body. After the bulk of the exothermic hot topping reaction had subsided, the top and sides of the graphite boat 50 were covered with an approximately 2 inch thick layer of CERABLANKET® ceramic fiber insulation material to assist in the directional solidification of the matrix metal. After cooling to substantially room temperature, the GRAFOIL® box 52 was removed from the graphite boat 50 and was disassembled to reveal that the matrix metal had infiltrated the preform to produce a metal matrix composite body. The residual matrix metal was separated from the remainder of the lay-up by using moderate hand pressure. The bedding material admixture 68 was removed with light hammer blows. The graphite riser ring 64 and its attached GRAFOIL® sheet 62 were removed by sandblasting. Measurement of the dimensions of the formed metal matrix composite tile using a pair of calipers revealed that substantially no dimensional change had taken place during the spontaneous infiltration process. Thus, this Example illustrates that the use of a refractory binder permits the formation of a metal matrix composite body which substantially identically replicates the shape of the preform.

EXAMPLE 2

This Example demonstrates that through the use of a colloidal alumina refractory high temperature binder in a preform that any preform expansion during spontaneous infiltration can be reduced or even substantially completely eliminated.

Two preforms, each preform having approximate measurements of 7 inches (178 mm) by 7 inches (178 mm) by 0.5 inch (13 mm), were sediment cast from a mixture of a 220 grit alumina material known by the trade name 38 ALUNDUM® and produced by Norton Co., and colloidal alumina paste (NYACOL AL-20). The approximate weight ratio of the colloidal alumina paste to the 220 grit 38 Alundum was 70/30.

Figure 2:
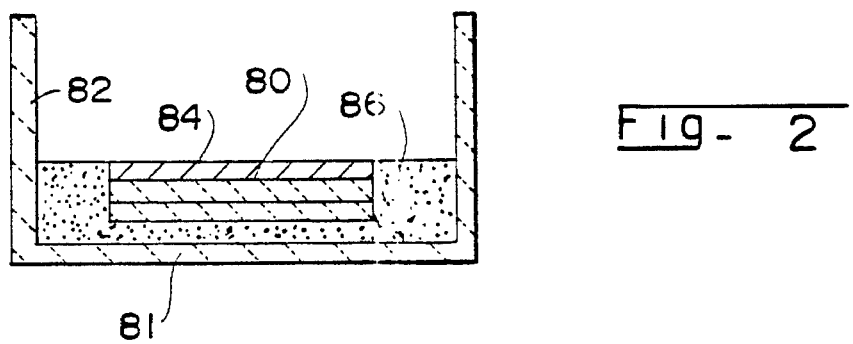
FIG. 2 is a schematic cross-sectional view of a lay-up used in accordance with the present invention.

After the preforms had dried and set, a thin (approximately 1/64 inch (0.4 mm) thick) layer of colloidal alumina paste (NYACOL AL-20) was painted on a surface of each of the two preforms. The two painted surfaces were then brought into contact so as to sandwich the colloidal alumina between the two preforms. As shown in FIG. 2, this assembly of preforms (80), including the interfacial layer (81) of colloidal alumina, was then placed within a refractory boat (82) on top of an approximately ½ inch (13 mm) thick layer of Grade HCT titanium diboride produced by Union Carbide. An ingot (84) of matrix metal having approximate dimensions of 7 inches (178 mm) by 7 inches (178 mm) by ½ inch (13 mm) and composed by weight of approximately 5% silicon, 5% zinc, 7% Mg, 2% copper and the balance aluminum was placed on top of the assembly of preforms (80). Additional Grade HCT titanium diboride was then added to the refractory boat (82) until the surface of the bed (86) of titanium diboride was approximately level with the upper surface of the matrix metal ingot (84).

The setup, consisting of the refractory boat (82) and its contents, was then placed within a controlled atmosphere electric resistance heated vacuum furnace at room temperature. A high vacuum (approximately $1 \times 10^{-4}$ torr) was then achieved within the furnace and the furnace temperature was raised to about 200° C. in about 45 minutes. The furnace temperature was maintained at about 200° C. under vacuum conditions for approximately 2 hours. After this initial two hour heating period, the furnace was backfilled with nitrogen gas to approximately 1 atmosphere and the temperature was raised to about 865° C. in approximately 5 hours; maintained at about 865° C. for about 18 hours; and then ramped to room temperature in about 5 hours.

After reaching room temperature, the setup was removed from the furnace and disassembled. It was observed that the preform corresponded in size and shape to the formed metal matrix composite body.

EXAMPLE 3

This Example demonstrates that through the use of a refractory boat containing a colloidal silica refractory high temperature binder that any preform expansion during spontaneous infiltration can be reduced or even substantially completely eliminated.

Figure 3:
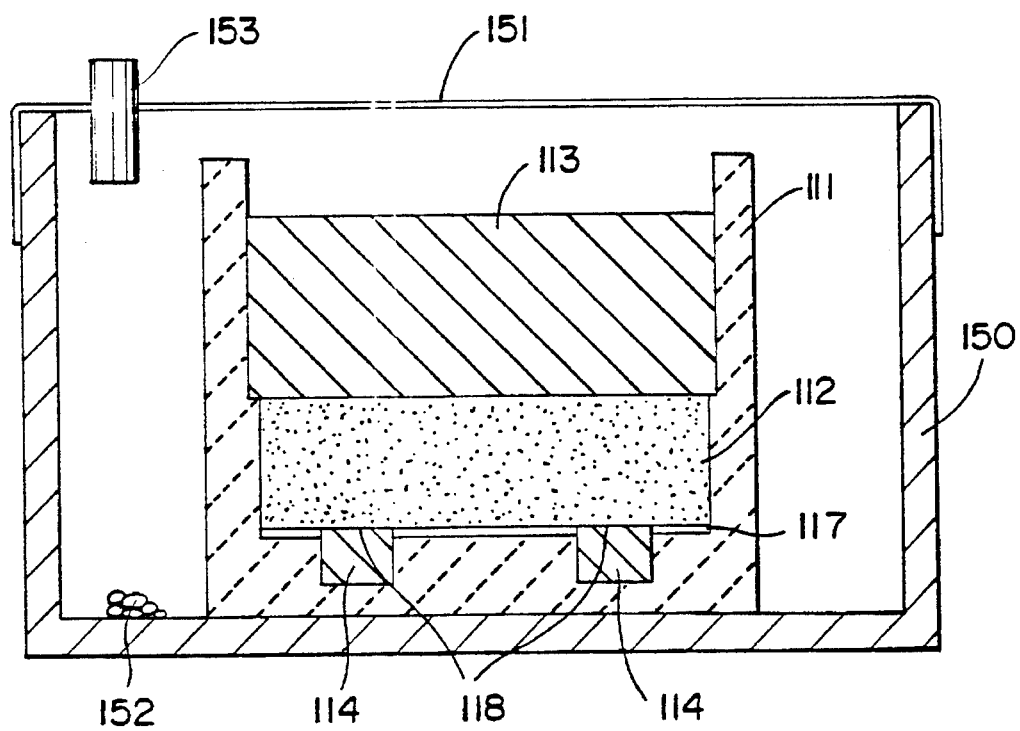
FIG. 3 is a schematic cross-sectional view of a lay-up used in accordance with the present invention.

As shown in FIG. 3, a silica mold (111) having an inner diameter of approximately 5 inches (127 mm) by 5 inches (127 mm) and 3¼ inches (83 mm) in height, and having nine holes of about ¾ inch (19 mm) diameter and ¾ inch (19 mm) depth in the bottom of the mold (111), was formed by first mixing a slurry of about 2.5 to 3 parts by weight of RANCO-SILυ 4 silica powder, about 1 part by weight colloidal silica (NYACOL® 830 from Nyacol Products of Ashland, Mass.) and about 1 to 1.5 parts by weight of RANCO-SIL™ A silica sand (Ransom and Randolf of Maumee, Ohio). The slurry was poured into a rubber mold having the negative shape of the desired silica mold and placed in a freezer overnight. The silica mold was subsequently removed from the rubber mold, fired at about 800° C. in an air furnace for about 1 hour and allowed to cool to room temperature.

The bottom surface of the formed silica mold (111) was covered with an approximately 5 inch by 5 inch by 0.010 inch (6.25 mm) thick PF-25-H graphite tape product (117) sold by TTAmerica, Portland, Oreg., under the trade name PERMAFOIL having approximately ¾ inch (19 mm) diameter holes (118) cut into the graphite tape sheet (117) to correspond in position to the holes in the bottom of the silica mold (111). The holes in the bottom of the mold (111) where filled with approximately ¾ inch (19 mm) diameter by ¾ inch (19 mm) thick plugs (114) of a metal identical in composition to the matrix metal alloy composed of approximately 10% by weight magnesium and the balance aluminum. Approximately 819 grams of a 500 grit alumina filler material (112) known as 38 ALUNDUM® and produced by the Norton Company, was mixed with about 5 weight percent magnesium powder and shaken for about 15 minutes in a nalgene jar. The filler material (112) was then placed into the mold (111) to a depth of approximately ¾ inch (19 mm) and tamped lightly to level the surface of the filler material (112). Approximately 1399 grams of a matrix metal ingot (113), comprising about 10% by weight magnesium and the balance aluminum, were placed on top of the bed of alumina filler material (112) within the silica mold (111). The mold (111) and its contents were then placed into an approximately 10 inch (254 mm) by 10 inch (254 mm) by 8 inch (203 mm) high stainless steel container (150). A titanium sponge material (152), weighing about 20 grams, from Chemalloy Company Inc., Bryn Mawr, Pa., was sprinkled into the stainless steel can around the silica mold (111). A sheet of copper foil (151) was placed over the exposed surface of the stainless steel container (150) so as to form an isolated chamber. A nitrogen purge tube (153) was provided through the sheet of copper foil (151), and the stainless steel container (150) and its contents were placed into a air atmosphere resistance heated utility box furnace. (UNIQUEυ kilns and Furnaces, HED Industries, Ringoes, N.J.) The system was ramped from room temperature to about 600° C. at a rate of about 400° C. per hour with a nitrogen flow rate of about 10 liters per minute, then heated from about 600° C. to about 775° C. at a rate of about 400° C. per hour with a nitrogen flaw rate of about 2 liters per minute. The system was held at about 775° C. for about 1.5 hours with a nitrogen flow rate of about 2 liters per minute. The system was removed from the furnace at temperature, excess molten alloy was poured out, and a room temperature copper chill plate having dimensions of approximately 5 inches (127 mm) by 5 inches (127 mm) by 1 inch (13 mm) thick was placed within the silica mold (111) such that it contacted a top portion of residual metal (113), to directionally cool the formed composite.

Upon removal from the silica mold, it was observed that the preform corresponded in size and shape to the formed metal matrix composite body.

What is claimed is:

1. A method for making a metal matrix composite body, comprising:

providing a permeable mass comprising at least one filler material;

placing a loose mass comprising at least one bedding material comprising at least one glass frit around at least a portion of said permeable mass;

partially sintering at least said at least one bedding material to a temperature sufficient and for a time sufficient to rigidize said loose mass of at least one bedding material while maintaining at least some permeability of said permeable mass; and spontaneously infiltrating at least a portion of said permeable mass with a molten matrix metal.

2. The method of claim 1, wherein said partially sintering comprises firing in an oxygen-containing atmosphere.

3. The method of claim 2, wherein said permeable mass comprises at lest one non-oxide filler material.

4. The method of claim 3, wherein said firing forms a three-dimensionally interconnected oxide skeleton contacting and embedding said at least one non-oxide filler material.

5. The method of claim 4, wherein said oxide skeleton comprises silica.

6. The method of claim 3, wherein said at least one non-oxide filler material comprises silicon carbide.

7. The method of claim 1, wherein said permeable mass comprises at least one self-supporting preform.

8. The method of claim 1, wherein said permeable mass further comprises at least one infiltration enhancer precursor.

9. The method of claim 8, wherein said partially sintering further comprises heating to a temperature less than and for an amount of time less than that which would result in a volumetric expansion of said permeable mass sufficient to cause the formation of cracks in said permeable mass.

10. The method of claim 8, wherein said partially sintering comprises controllably converting at least a portion of said infiltration enhancer precursor to an amount of infiltration enhancer which is sufficient to at least coat and at least partially embed said at least one filler material with a three-dimensionally interconnected skeleton structure.

11. The method of claim 8, wherein said infiltration enhancer precursor is provided in less than an amount which could cause swelling of said permeable mass upon said heating.

* * * * *

UNITED STATES PATENT AND TRADEMARK OFFICE
CERTIFICATE OF CORRECTION

PATENT NO. : 5,500,244
DATED : March 19, 1996
INVENTOR(S) : Michael A. Rocazella et al.

It is certified that error appears in the above-indentified patent and that said Letters Patent is hereby corrected as shown below:

On the title page, item [54] and column 1, lines 4 and 5, delete "AND ARTICLES PRODUCED".

| | | |
|---|---|---|
| Column 12, | line 23: | change "thermally" to --thermically-- |
| Column 12, | line 56: | change "the," to --the-- |
| Column 20, | line 65: | change "Raking" to --Making-- |
| Column 24, | line 66: | change "With" to --with-- |
| Column 27, | line 30: | change "NYACOL" to --NYACOL®-- |
| Column 27, | line 32: | change "Alundum" to --ALUNDUM®--. |
| Column 27, | line 35: | change "NYACOL" to --NYACOL®-- |
| Column 28, | line 8: | after "binder", insert --to house a filler material such-- |
| Column 28, | line 8: | change "preform" to --filler material-- |
| Column 28, | line 17: | change "RANCO-SILv" to --RANCO-SIL™-- |
| Column 28, | line 62: | change "UNIQUEv" to --UNIQUE™ --. |

UNITED STATES PATENT AND TRADEMARK OFFICE
CERTIFICATE OF CORRECTION

Page 2 of 2

PATENT NO. : 5,500,244
DATED : March 19, 1996
INVENTOR(S) : Michael A. Rocazella, et. al.

It is certified that error appears in the above-indentified patent and that said Letters Patent is hereby corrected as shown below:

Column 30, line 2: change "lest" to --least--.

Signed and Sealed this

Twenty-sixth Day of November 1996

Attest:

BRUCE LEHMAN

Attesting Officer    Commissioner of Patents and Trademarks